United States Patent
Todoroki

(10) Patent No.: US 9,042,609 B2
(45) Date of Patent: May 26, 2015

(54) FACE AUTHENTICATION SYSTEM, FACE AUTHENTICATION METHOD, AND FACE AUTHENTICATION PROGRAM

(75) Inventor: Yasuhiro Todoroki, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 13/695,248

(22) PCT Filed: Sep. 5, 2011

(86) PCT No.: PCT/JP2011/070188
§ 371 (c)(1),
(2), (4) Date: Oct. 29, 2012

(87) PCT Pub. No.: WO2013/035150
PCT Pub. Date: Mar. 14, 2013

(65) Prior Publication Data
US 2014/0169643 A1    Jun. 19, 2014

(51) Int. Cl.
*G06K 9/00* (2006.01)
*G06K 9/03* (2006.01)
*G06K 9/46* (2006.01)

(52) U.S. Cl.
CPC ........ *G06K 9/00248* (2013.01); *G06K 9/00288* (2013.01); *G06K 9/03* (2013.01); *G06K 9/4661* (2013.01)

(58) Field of Classification Search
None
See application file for complete search history.

(56) References Cited

U.S. PATENT DOCUMENTS

| 6,711,293 | B1 * | 3/2004 | Lowe ............................ 382/219 |
| 7,106,887 | B2 * | 9/2006 | Kinjo ............................ 382/118 |
| 7,773,819 | B2 | 8/2010 | Hiraga et al. |
| 7,847,823 | B2 | 12/2010 | Habuka et al. |
| 2007/0222864 | A1 | 9/2007 | Hiraga et al. |
| 2008/0180535 | A1 | 7/2008 | Habuka et al. |
| 2008/0181506 | A1 * | 7/2008 | Nishizawa .................... 382/190 |
| 2009/0028403 | A1 * | 1/2009 | Bar-Aviv et al. .............. 382/128 |
| 2009/0258667 | A1 * | 10/2009 | Suzuki et al. ............... 455/550.1 |

FOREIGN PATENT DOCUMENTS

| CN | 1928889 | 3/2007 |
| CN | 101378511 | 3/2009 |
| CN | 101600113 | 12/2009 |
| JP | H11-306348 | 11/1999 |

(Continued)

OTHER PUBLICATIONS

Makoto Kosugi "Human-Face Search and Location in a Scene by Multi-Pyramid Architecture for Personal Identification", D-II vol. J77-D-H, No. 4, pp. 672-681, Apr. 1994.

(Continued)

*Primary Examiner* — Chan Park
*Assistant Examiner* — Elisa Rice
(74) *Attorney, Agent, or Firm* — Muramatsu & Associates

(57) ABSTRACT

Provided is a face authentication system (100) including a reflectance image generating unit (107) for generating a blurred image of an input image based on the input image including a face of a person and generating an input reflectance image by separating each corresponding pixel value of the blurred image from each pixel value of the input image, and a face authenticating unit (112) for performing face authentication of the face of the person included in the input image by comparing the input reflectance image with a registered reflectance image of a previously registered person.

6 Claims, 8 Drawing Sheets

(56) References Cited

FOREIGN PATENT DOCUMENTS

| | | |
|---|---|---|
| JP | 2000-342558 | 12/2000 |
| JP | 2003-58888 | 2/2003 |
| JP | 2003-323622 | 11/2003 |
| JP | 2007-72814 | 3/2007 |
| JP | 2007-140723 | 6/2007 |
| JP | 2008-9745 | 1/2008 |
| JP | 2009-151539 | 7/2009 |
| JP | 2009-211425 | 9/2009 |
| JP | 2010-152706 | 7/2010 |
| JP | 2010-193199 | 9/2010 |
| WO | WO 2009/107237 | 9/2009 |

OTHER PUBLICATIONS

Ge Wei et al. "Face image illumination processing based on improved Retinex", Optics and Precision Engineering, vol. 18, No. 4, Apr. 15, 2010.

Xia Zhenjie, "An introduction of the Implementation of the Authentication System based on Face Recognition Technology", Science & Technology Information, No. 5, Feb. 15, 2010.

\* cited by examiner

| REGISTERED REFLECTANCE IMAGE | DISPLACEMENT |
|---|---|
| 222a | (+1, +1) |
| 222b | (+2, +2) |
| 222c | (-2, -1) |
| : | : |

124

(a)

202

(b)

204

(c)

206

(a)

| -1 | -2 | -1 |
|---|---|---|
| 0 | 0 | 0 |
| 1 | 2 | 1 |

(b)

| -1 | 0 | 1 |
|---|---|---|
| -2 | 0 | 2 |
| -1 | 0 | 1 |

FACE AUTHENTICATION SYSTEM, FACE AUTHENTICATION METHOD, AND FACE AUTHENTICATION PROGRAM

This application is a national stage of International Application No. PCT/JP2011/070188 filed Sep. 5, 2011, the entire contents of which are incorporated herein by reference.

TECHNICAL FIELD

The present invention relates to a face authentication system, a face authentication method, and a face authentication program.

BACKGROUND ART

In order to authenticate a person's identity, face authentication processes for obtaining a face image of a person and comparing the face image with a previously registered face image of a registrant have been being developed. In the case where images are compared for authentication, it is problematic that the facial features may be altered due to the influence of oblique lighting or illumination effects such as the shade of a tree when the face image of a person is obtained, and therefore the authentication may not be accurately performed.

Japanese Unexamined Patent Publication No. 2007-140723 discloses a technique of calculating a lighting angle of an input image, selecting a filter based on the calculated angle, and defining the facial features of a person extracted from the input image, using the selected filter. This publication discloses that a Gabor filter is used for extracting features, as a Gabor filter is selected in consideration of the size and direction of a lighting angle of each block. Japanese Unexamined Patent Publication No. H11-306348 discloses a technique of designating, when detecting a subject of recognition target such as face, local comparison regions such as eye, nose, lip with respect to an input image in order, normalizing brightness of the designated local comparison regions, and then partially obtaining determination factors with respect to the local comparison regions. Thereby, it is said that a subject of recognition target may be detected without being seriously influenced by the change of environments such as a light source.

Japanese Unexamined Patent Publication No. 2008-9745 discloses a face detection technique using an edge detection filter to detect a face from an image from which the influence of an illumination light is removed.

Japanese Unexamined Patent Publication No. 2009-151539 discloses a technique of determining whether each image of face detection target has a shadow or not and removing the shadow from a cut image which is determined as having a shadow.

SUMMARY OF THE INVENTION

Technical Problem

However, when face authentication is conducted, in the technique of performing local correction of a specific portion as disclosed in Japanese Publication No. 2007-140723 or H11-306348 noted above, the information from an area other than the specific portion, for example a less prominent portion of skin of the face, may not be used, and therefore it is impossible to perform accurate authentication.

In addition, in the technique of using the edge detection filter as disclosed in Japanese Publication No. 2008-9745 noted above or in the technique of determining the presence of a shadow as disclosed in Japanese Publication No. 2009-151539 noted above for a portion, at a gentle slope portion in pixel values of adjacent pixels, for example a skin portion of a face, it is difficult to satisfactorily remove the influence of an illuminating light source.

The inventor has carefully reviewed the techniques of enhancing authentication accuracy when performing face authentication, and it is found that the inherent facial features of a person can be accurately extracted without being influenced by various photographic environments including an illumination source by using a reflectance component of person's face.

Here, the Retinex theory, an original image photographed by a photographing device such as a camera is composed of an illumination light component and a reflectance component, is known. For example, Japanese Unexamined Patent Publication No. 2010-193199 discloses that a corrected image having an improved contrast is obtained by correcting an input image by means of the Retinex theory.

The present invention is designed in consideration of the above, and the present invention is directed to providing a technique capable of satisfactorily removing the influence of photographic environments from an input image and a registered image when face authentication is performed, and capable of performing an authentication process with high accuracy.

Technical Solution

In one general aspect, the present invention provides a face authentication system, which includes: a reflectance image generating unit for generating a blurred image of an input image based on the input image including a face of a person and generating an input reflectance image by separating each corresponding pixel value of the blurred image from each pixel value of the input image; and a face authenticating unit for performing face authentication of the face of the person included in the input image by comparing the input reflectance image with a registered reflectance image of a previously registered person.

In another aspect, the present invention provides a face authentication method which includes: generating a blurred image of an input image based on the input image including a face of a person and generating an input reflectance image by separating each corresponding pixel value of the blurred image from each pixel value of the input image; and performing face authentication of the face of the person included in the input image by comparing the input reflectance image with a registered reflectance image of a previously registered person.

In another aspect, the present invention provides a face authentication program which allows a computer to function as: a reflectance image generating means for generating a blurred image of an input image based on the input image including a face of a person and generating an input reflectance image by separating each corresponding pixel value of the blurred image from each pixel value of the input image; and a face authenticating means for performing face authentication of the face of the person included in the input image by comparing the input reflectance image with a registered reflectance image of a previously registered person.

The inventor has found that, in order to enhance the authentication accuracy at face authentication, it is necessary to reflect not only the concept of removing the influence of illumination light from an input image, but also the concept of removing the influence of photographic environments from both the input image and the registered image, and thereby having reached the present invention. Here, the influences of photographic environments may be, for example, influences caused by the difference in illumination light at photographing, the difference caused by the kind or performance of a photographing device such as a camera, and the difference caused by a photographing condition such as white balance or exposure.

According to the face authentication technique of the present invention, since the reflectance image is used when face authentication is performed, the influence of photographic environments can be satisfactorily removed from the input image and the registered image. By doing so, the inherent facial features of the person can be compared, and thereby it is possible to perform the face authentication with a high degree of accuracy.

In addition, by using such a blurred image, without depending on image characteristics based on the influence of photographic environments or the differences in photographed persons, widely-used processes can be used.

In addition, combinations of the above components, or modifications of the essential features of the present invention among methods, apparatuses, systems, storage media and computer programs, are also effective as the aspects of the present invention.

Advantageous Effects

According to the present invention, when face authentication is performed, the influence of photographic environments can be satisfactorily removed from an input image and a registered image, and the authentication process can be performed with a high degree of accuracy.

DESCRIPTION OF PREFERRED EMBODIMENTS

Hereinafter, embodiments of the present invention will be described in detail with reference to accompanying drawings.

Note that, in all drawings, the same component will be identified by the same reference symbol, and duplicate descriptions will be suitably omitted.

First Embodiment

Figure 1:
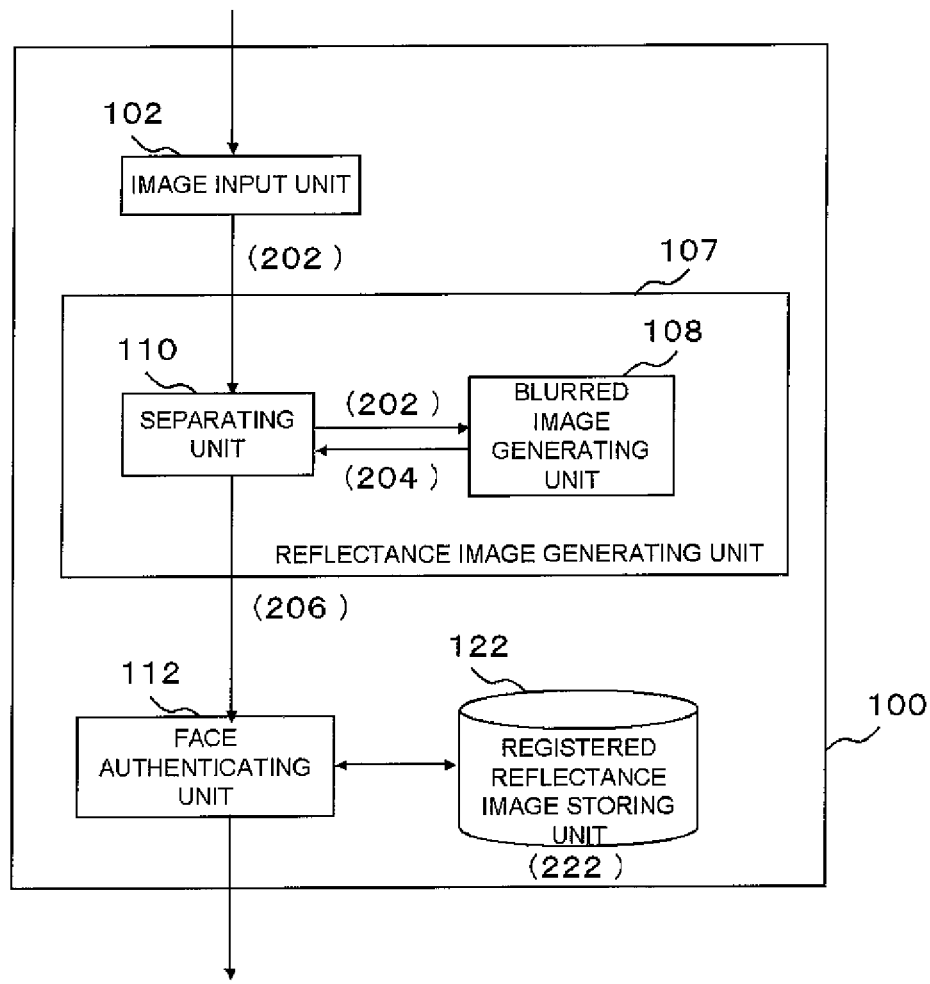
FIG. 1 is a block diagram showing an example of a face authentication system according to an embodiment of the present invention.

FIG. 1 is a block diagram showing the configuration of a face authentication system of this embodiment. The face authentication system 100 includes an image input unit 102, a reflectance image generating unit 107, a face authenticating unit 112, and a registered reflectance image storing unit 122. The reflectance image generating unit 107 includes a blurred image generating unit 108 and a separating unit 110.

Figure 2:
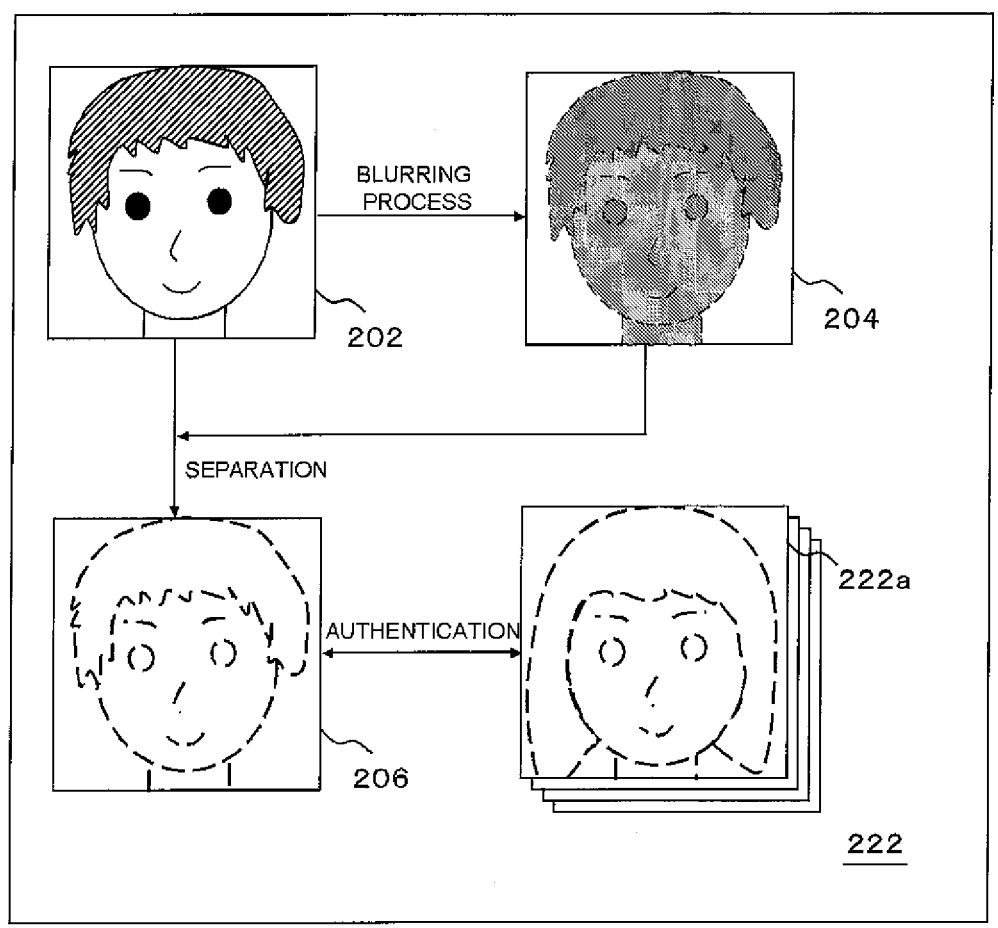
FIG. 2 is a conceptual diagram for illustrating a processing order of the face authentication system according to the embodiment of the present invention.

FIG. 2 is a conceptual diagram for illustrating a processing order of the face authentication system of this embodiment. Hereinafter, this embodiment will be described with reference to FIGS. 1 and 2.

The image input unit 102 inputs an input face image 202 of a subject, which includes a face of a person. The reflectance image generating unit 107 generates an input reflectance image 206 based on the input face image 202.

In detail, in this embodiment, the reflectance image generating unit 107 generates the input reflectance image 206 according to Equations (1) to (3) below.

[Equation 1]

$$R_i(x, y) = \log \frac{I_i(x, y)}{L_i(x, y)} \quad (1)$$

Here, $I_i(x, y)$ is a pixel value of a coordinate (x, y) of an image to be processed (the input face image 202), $L_i(x, y)$ is a pixel value of a coordinate (x, y) of an image showing the influence of photographic environments, and $R_i(x, y)$ is a pixel value of a coordinate (x, y) of a reflectance image (the input reflectance image 206). Here, the pixel value may be considered as a feature representing the feature of each pixel, for example brightness, without being limited thereto.

The blurred image generating unit 108 generates a blurred input image 204 representing the influence of photographing environments, by blurring the input face image 202. The blurred image generating unit 108 may generate the blurred input image 204 by, for example, smoothing the input face image 202.

In this embodiment, the blurred image generating unit 108 may generate the blurred input image 204 by applying a Gaussian filter to the input face image 202. This example will be shown in Equations (2) and (3). F (x, y) of Equation (2) is a Gaussian filter (Gauss function) as shown in Equation (3). [*] represents a convolution integral.

[Equation 2]

$$L_i(x, y) = F(x, y) * I_i(x, y) \quad (2)$$

[Equation 3]

$$F(x, y) = \frac{1}{2\pi\sigma^2} \exp\left(-\frac{x^2 + y^2}{2\sigma^2}\right) \quad (3)$$

In other words, here, the pixel value of each pixel of the input face image 202 is substituted with a weighted mean value where a large weight is added to a pixel value of a pixel close to the corresponding pixel and a small weight is added to a pixel value of a pixel far from the corresponding pixel. By doing so, blurring may be performed naturally. Here, a is a standard deviation.

In this embodiment, the Gaussian filter may be applied to the input face image 202 several times. In the case where the Gaussian filter is applied to the input face image 202 several times, for example, a Gaussian filter having a large filter size may be firstly applied, and then a Gaussian filter of a small size may be applied. In this configuration, it is possible to obtain a satisfactory blurred input image 204 totally blurred while remaining local features of the input face image 202.

The separating unit 110 generates the input reflectance image 206 by dividing the pixel value of each pixel of the input face image 202 by the pixel value of each pixel corresponding to the blurred input image 204, based on Equation (1), and then calculating its log. By doing so, the input reflectance image 206 where each pixel value corresponding to the blurred input image 204 is separated from each pixel value of the input face image 202 is obtained. The input face image 202, the blurred input image 204, the input reflectance image 206, and the registered reflectance image 222 of FIG. 2 are conceptual views and do not represent actually processed images.

Figure 8:
FIG. 8 is a diagram showing an actually processed image processed by the face authentication system according to the embodiment of the present invention.
Figure 8:
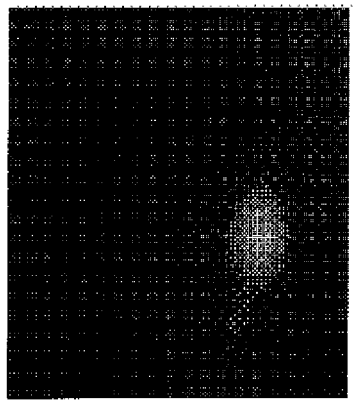
Figure 8:

FIG. 8 is a diagram showing an actually processed image. FIG. 8b shows a blurred input image 204 generated by actually applying a Gaussian filter to the input face image 202 shown in FIG. 8a. FIG. 8c shows an input reflectance image 206 generated by separating the pixel value of the blurred input image 204 of FIG. 8b from the pixel value of the input face image 202 of FIG. 8a. In the input face image 202 of FIG. 8a, it could be understood that the right half of a face of a person is brighter than the left half due to the influence of illumination light. Meanwhile, in the input reflectance image 206 of FIG. 8c, this influence of illumination light is almost removed.

The registered reflectance image storing unit 122 stores a previously registered face image of a person as a comparable reference when the input reflectance image 206 performs face authentication. In this embodiment, the previously registered face image may be a reflectance image obtained by applying Equations (1) to (3) to an image captured by a photographic device such as a camera. The registered reflectance image storing unit 122 stores registered reflectance images 222 of a plurality of persons. Each registered reflectance image 222 may be set so that the face is oriented to the front and occupies a center region.

The face authenticating unit 112 performs face authentication by comparing the input reflectance image 206 generated by the reflectance image generating unit 107 with each registered reflectance image 222 (e.g., 222a) stored in the registered reflectance image storing unit 122 to calculate similarity. In this embodiment, the face authenticating unit 112 calculates a correlation coefficient of pixel values of the input reflectance image 206 and each registered reflectance image 222. The face authenticating unit 112 determines that the person of the input reflectance image 206 is identical to the person of the registered reflectance image 222 if the correlation coefficient is equal to or larger than a predetermined set value. Here, the correlation coefficient may use, for example, Pearson's correlation (cosine correlation). The face authenticating unit 112 outputs the determination result.

In this embodiment, the blurred input image 204 is generated by smoothing small pixel differences of the input face image 202. For this reason, the blurred input image 204 may approximately show the difference in photographic environments, such as differences caused by the kind or performance of a photographing device like a camera and differences caused by a photographic condition like white balance or exposure in addition to the difference in illumination light at photographing. By doing so, the input reflectance image 206 generated by correcting the input face image 202 into such a blurred input image 204 may exhibit inherent features of the face of a person without being affected by the differences in photographic environments. In addition, the registered reflectance image 222 generated in the same way may also exhibit inherent features of the face of a person without being affected by the differences in photographic environments.

As described above, according to the face authentication system 100 of this embodiment, since reflectance images are compared when face authentication is performed, the influence of photographic environments may be satisfactorily removed from the input image and the registered image. By doing so, inherent features of the face of the person may be compared, and therefore it is possible to perform face authentication with a high degree of accuracy.

In addition, in this embodiment, the input reflectance image 206 is obtained by using the blurred input image 204 in which each pixel of the input face image 202 is corrected by a weighted mean value, where the weighted value decreases with distance, based on pixel values of the corresponding pixel and surrounding pixels. As described above, when the blurred input image 204 is generated, pixel values of the surrounding pixels are also used. For this reason, even a minute position distortion may be satisfactorily corrected, and thereby, even though there are position distortions to some extent, the face authentication may be performed with a high degree of accuracy.

Further, consider the case in which a face image is authenticated by extracting only feature points such as eye and lip and determining similarity based only on the feature points. In such a case, if a pixel value of a portion where the slope of a pixel value difference of adjacent pixels is small is also used to perform authentication based on a correlation coefficient of a pixel value, the authentication, may be easily influenced by the shade of the image. However, in this embodiment, by using the reflectance image, the shadow of the image may be reduced without depending on the image characteristics. For this reason, the pixel value of the portion where the slope of a pixel value difference of adjacent pixels is small may also be used as feature amount, and thereby it is possible to perform authentication with a high degree of accuracy.

In the case where a conventional edge filter where an image is corrected based on a pixel value difference of adjacent pixels is used, a portion where the pixel value difference is large may be corrected, but a portion where the pixel value difference is small may not be corrected. For this reason, for example, since a portion having a small difference in shade between pixels, such as a skin portion, may not be suitably corrected, it is difficult to determine similarity of the portion with high accuracy. In addition, since this conventional process is performed locally, if there is a position distortion, an error may increase. According to the face authentication system 100 of this embodiment, however, by applying a Gaussian filter to the entire input face image 202, the blurred input image 204 may be generated by means of uniform processing regardless of a pixel value of each pixel of the input face image 202. Then, the input face image 202 is corrected by the blurred input image 204. For this reason, uniform processing may be applied to the entire image, and thereby it is possible to reduce the influence of photographic environments regardless of image characteristics.

In addition, according to the face authentication system 100 of this embodiment, calculation amount may be reduced compared with the case where a Gabor filter disclosed in Japanese Publication No. 2007-140723 is used.

Second Embodiment

The input image from the image input unit 102 may not be a face image in a front-oriented state in a predetermined range, and thereby a position distortion may occur in the face. In the face authenticating unit 112, when the input image is compared with the registered image, in the case where authentication is performed based on the correlation coefficient of the pixel value, the accuracy of a calculation value of the correlation coefficient may be deteriorated due to the face position distortion. Therefore, in this embodiment, the face authentication system 100 corrects the position distortion of the input image.

Figure 3:
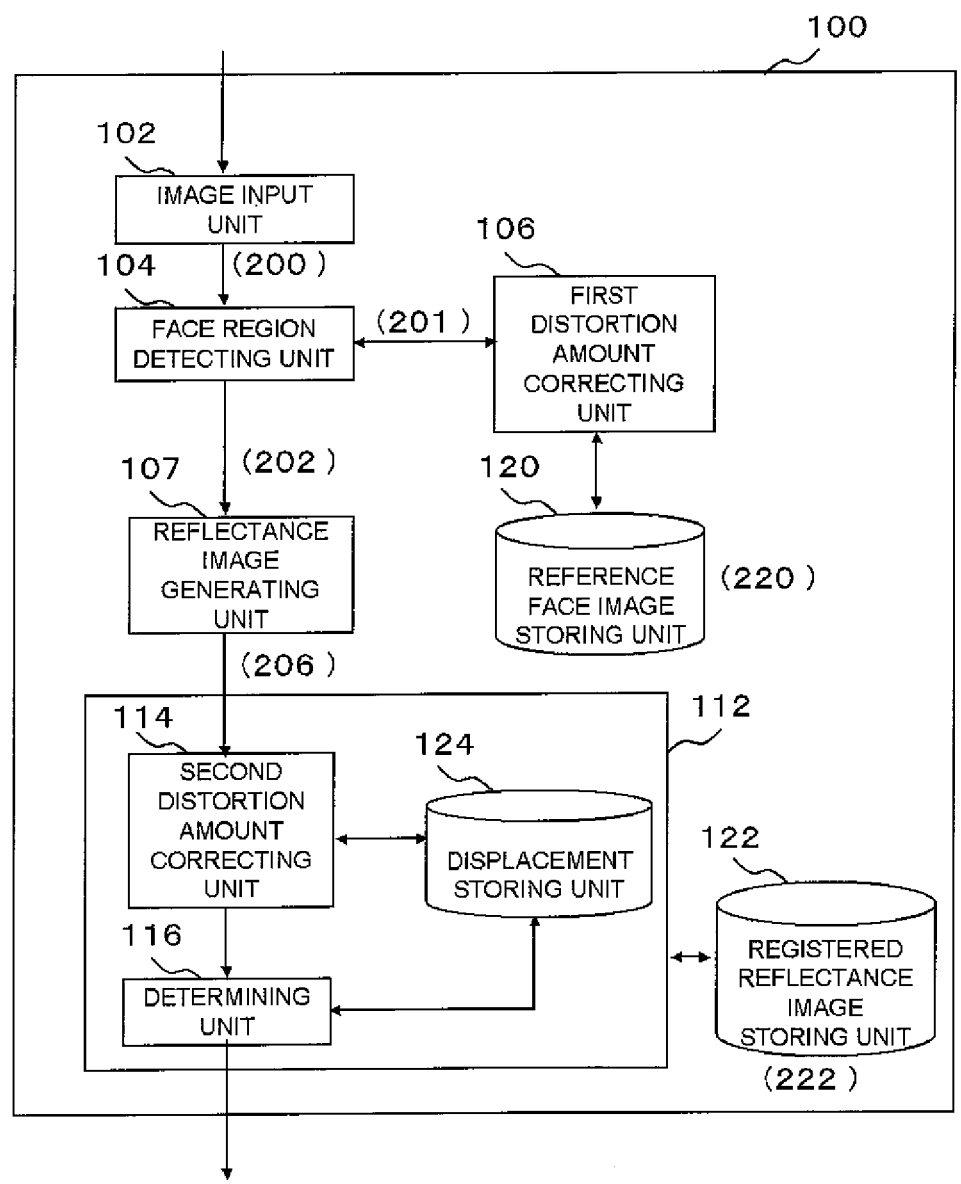
FIG. 3 is a block diagram showing another example of the face authentication system according to the embodiment of the present invention.

FIG. 3 is a block diagram showing the face authentication system 100 of this embodiment. In this embodiment, the face authentication system 100 includes a face region detecting unit 104, a first distortion amount correcting unit 106, and a reference face image storing unit 120 in addition to the components of the first embodiment described with reference to FIG. 2. In addition, the face authenticating unit 112 includes a second distortion amount correcting unit 114, a determining unit 116, and a displacement storing unit 124.

In this embodiment, the input image 200 input by the image input unit 102 may not be fully recognized as having only the face and may not be fully recognized as having the face in a front oriented state.

(Face Region Detection)

The face region detecting unit 104 detects a face region of a predetermined rectangular shape from the input image 200 input by the image input unit 102 by means of, for example, a face detecting technique such as the face detection method of Viola-Jones. Hereinafter, the description will be made by calling the face region detected by the face region detecting unit 104 an input face region image 201.

(First Distortion Amount Correction)

The reference face image storing unit 120 stores an average face image 220 where an average face that is an average of a plurality of persons' faces is front-oriented and occupies a main region.

Figure 4:
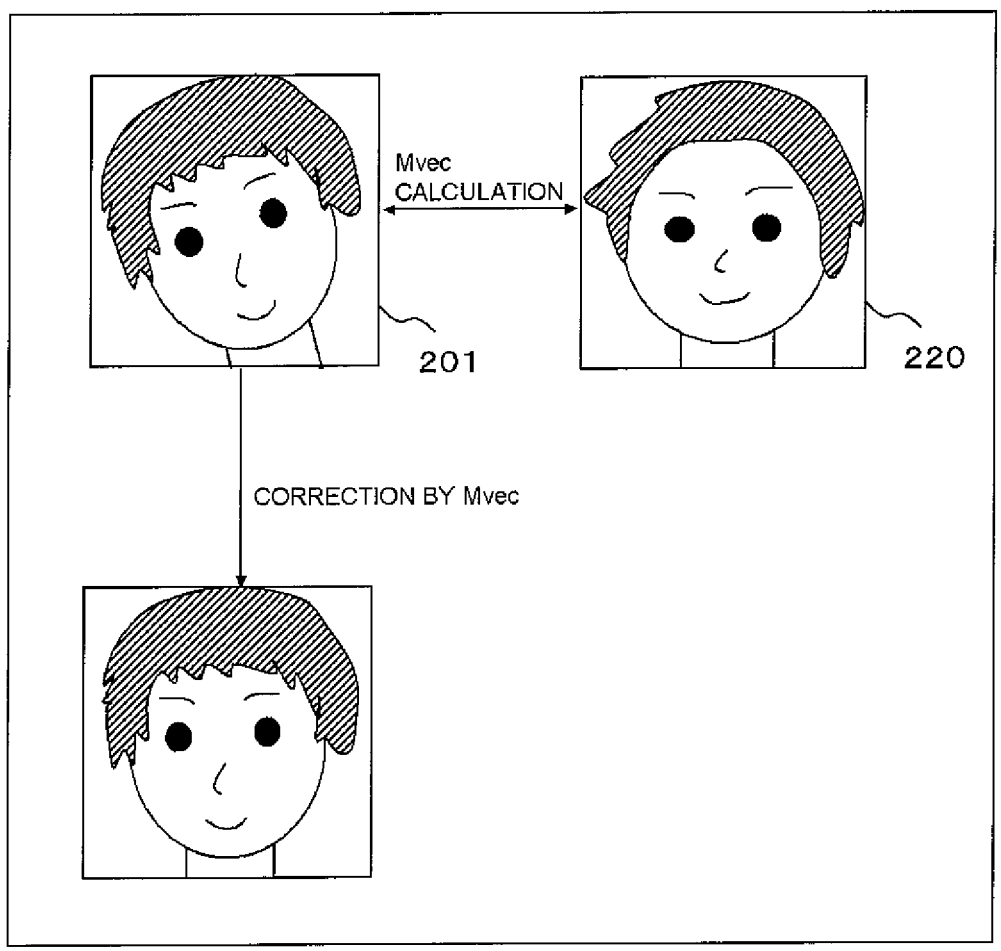
FIG. 4 is a schematic view showing the process of a first distortion amount correcting unit according to the embodiment of the present invention.

FIG. 4 is a schematic view for illustrating a processing order of the first distortion amount correcting unit 106 of this embodiment. The first distortion amount correcting unit 106 compares the input face region image 201 with the average face image 220 and calculates a motion vector (Mvec) of the input face region image 201 with respect to the average face image 220. The first distortion amount correcting unit 106 corrects a position distortion of the face image in the input face region image 201 based on the calculated motion vector (Mvec).

Here, the motion vector (Mvec) may employ a vector that is used for correcting camera-shaking of the image captured by a photographic device such as a camera. In this embodiment, the first distortion amount correcting unit 106 may calculate a motion vector for the average face image 220 of the input face region image 201 by using the technique disclosed in U.S. Pat. No. 7,847,823 or U.S. Pat. No. 7,773,819. U.S. Pat. No. 7,847,823 and U.S. Pat. No. 7,773,819 are incorporated herein by reference.

Figures 5, 6:
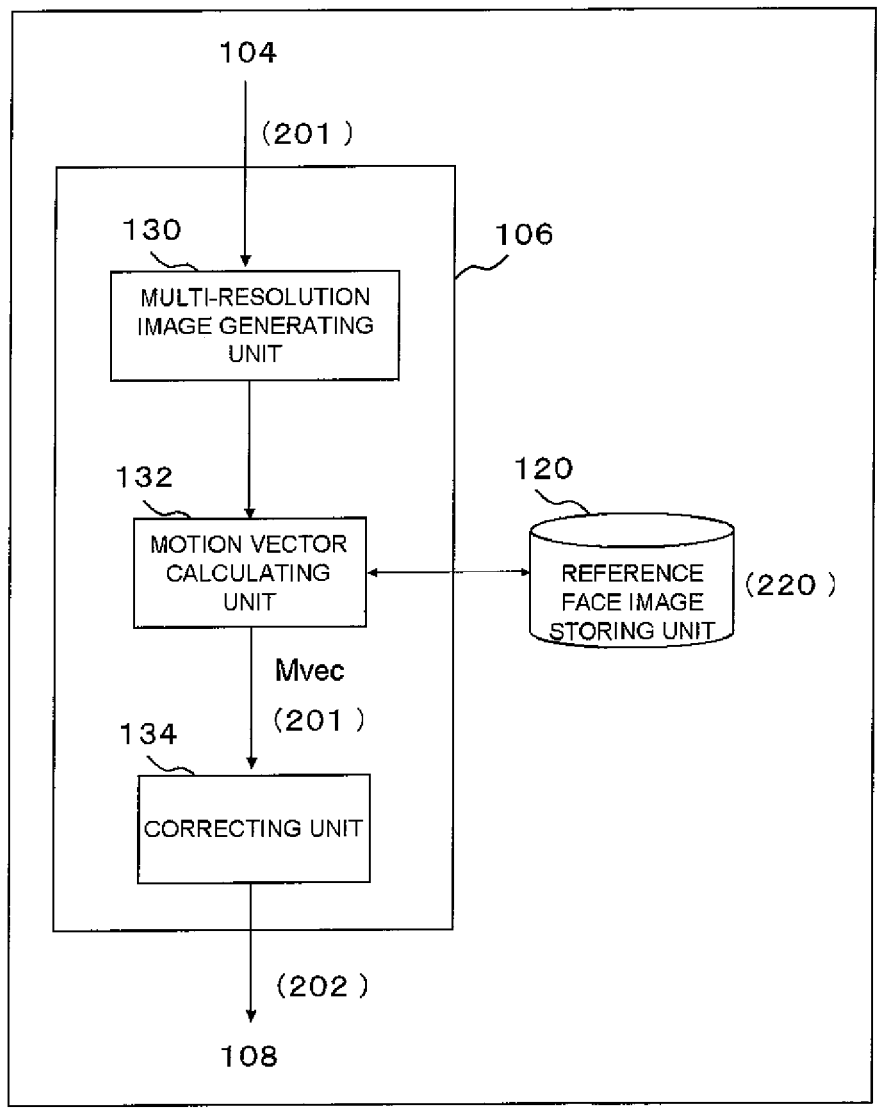
FIG. 5 is a block diagram showing an example of the first distortion amount correcting unit according to the embodiment of the present invention.
FIG. 6 is a diagram showing an example of a displacement storing unit.

FIG. 5 is a block diagram showing an example of the first distortion amount correcting unit 106. Here, the example where the motion vector (Mvec) is calculated according to the order disclosed in U.S. Pat. No. 7,773,819 will be described. The first distortion amount correcting unit 106 includes a multi-resolution image generating unit 130, a motion vector calculating unit 132, and a position distortion correcting unit 134 (in the figure, just written as a correcting unit).

The multi-resolution image generating unit 130 generates multi-resolution images up to a predetermined resolution level, for each of the input face region image 201 and the average face image 220. In addition, the multi-resolution images of the average face image 220 may be configured to be stored in the reference face image storing unit 120 in advance.

The motion vector calculating unit 132 firstly calculates a motion vector by detecting a two-dimensional distortion between images, based on the lowest resolution image of the multi-resolution image of the input face region image 201 and the average face image 220. Thereafter, the motion vector calculating unit 132 detects a two-dimensional distortion between images by using the motion vector calculated at the previous stage as an initial value, based on the image of the next lowest resolution, and corrects the motion vector. The motion vector calculating unit 132 repeats this process, and corrects the motion vector by means of an image with a higher resolution by using the motion vector obtained in a previous stage as an initial value so that a motion vector (Mvec) may be generated with a high degree of accuracy. In addition, the motion vector calculating unit 132 firstly performs a whole-range matching in regard to an image of a low resolution to detect a two-dimensional distortion between images, and performs block matching in regard to an image of a relatively high resolution to detect a distortion at each feature. In addition, in this embodiment, the motion vector (Mvec) may include displacement (horizontal and vertical distortions), rotating distortion (vertical or horizontal distortion or rotating distortion around an optic axis), enlargement or reduction (forward and rearward distortion).

The position distortion correcting unit 134 corrects the input face region image 201 based on the motion vector (Mvec) calculated by the motion vector calculating unit 132. By this process, even in the case where a position distortion occurs in the input face region image 201, the correction may be made using the average face image 220, and thereby the position distortion may be reduced. In addition, since position distortion is corrected based on the calculated motion vector, even in the case where a position distortion is relatively large or the face is oriented in a different direction, the correction may be performed satisfactorily. In this embodiment, the face region detecting unit 104 may detect a face region of a predetermined rectangular shape as the input face image 202 by means of a known face detection technique, from the input image 200 where a region corresponding to the input face region image 201 is corrected by the first distortion amount correcting unit 106. Here, the input face image 202 may have the same size as the registered reflectance image 222. The input face image 202 may have the same size as the input face region image 201 or may have a smaller size than the input face region image 201.

In order to calculate the motion vector, calculating amount increases, but by using the techniques disclosed in U.S. Pat. No. 7,847,823 or U.S. Pat. No. 7,773,819, a motion vector can be calculated with a high degree of accuracy by a relatively simple process without overburdening the computer. In addition, in this embodiment, since the motion vector is calculated based on the position distortion of the input face region image 201 and the average face image 220 by using the average face image 220, approximately correcting position distortion can be rapidly performed.

(Second Distortion Amount Correction)

Referring to FIG. 3 again, the second distortion amount correcting unit 114 performs minute corrections to the position distortion of the input reflectance image 206 generated by the reflectance image generating unit 107 with respect to each registered reflectance image 222 stored in the registered reflectance image storing unit 122.

Hereinafter, the processing order of the second distortion amount correcting unit 114 will be described. First, the second distortion amount correcting unit 114 selects a registered reflectance image 222 to be compared, from the registered reflectance image storing unit 122. Subsequently, the second distortion amount correcting unit 114 determines similarity between the input reflectance image 206 generated by the reflectance image generating unit 107 and the selected registered reflectance image 222. Here, a distance function is used to determine the similarity. In detail, the second distortion amount correcting unit 114 overlaps the input reflectance image 206 generated by the reflectance image generating unit 107 and the selected registered reflectance image 222, and calculates a distance difference between images by using a distance function. As the distance function, for example, an L1 distance (abs) may be used. The second distortion amount correcting unit 114 temporarily stores the calculated distance difference in the displacement storing unit 124.

Thereafter, the second distortion amount correcting unit 114 moves (perturbs) the input reflectance image 206 in the unit of pixel in a vertical or horizontal direction, and in a state where the registered reflectance image 222 is fixed, calculates a distance difference between the input reflectance image 206 in a moved state and the registered reflectance image 222. Here, the range of displacement of the input reflectance image 206 varies depending on the resolution of the input reflectance image 206, but may be set to be ±5 pixels or less both in the vertical and horizontal directions. The second distortion amount correcting unit 114 temporarily stores the calculated distance difference of each state of displacement in the displacement storing unit 124, so as to be associated with each displacement. If the calculation for each displacement state of a predetermined range is completed, the second distortion amount correcting unit 114 selects a displacement having the smallest distance difference as an optimal displacement of the input reflectance image 206 with respect to the registered reflectance image 222 and stores this displacement in the displacement storing unit 124. The second distortion amount correcting unit 114 performs the same process to each of other registered reflectance images 222 stored in the registered reflectance image storing unit 122.

In addition, the range of displacement of the input reflectance image 206 may vary depending on the size of the motion vector (Mvec) calculated by the motion vector calculating unit 132 of the first distortion amount correcting unit 106 in such a way that the range of displacement may increase when the size of the motion vector (Mvec) is large. When the size of the motion vector (Mvec) is large, correction amount of the first distortion amount correcting unit 106 also increases, and thereby a larger change is made from the original input image 200. For this reason, when the input reflectance image 206 is set to have a large displacement range in this case, instability caused by the change in size can be absorbed.

FIG. 6 is a diagram showing an example of the displacement storing unit 124. Here, the displacement storing unit 124 stores displacement (vertical and horizontal displacement) for each registered reflectance image 222 when a distance difference between the registered reflectance image 222 and the input reflectance image 206 is decreased to the minimum. Here, (+1,+1) represents a state where the input reflectance image 206 is moved by +1 pixel in both horizontal and vertical directions, and (−2,−1) represents a state where the input reflectance image 206 is moved by −2 pixel in the horizontal direction and by −1 pixel in the vertical direction. + in the horizontal direction represents movement in the right direction, and + in the vertical direction represents movement in the upper direction.

(Calculation of Correlation Coefficient)

Referring to FIG. 3 again, the determining unit 116 calculates a correlation coefficient of the input reflectance image 206 and each registered reflectance image 222. At this time, the determining unit 116 refers to the displacement storing unit 124, and calculates a correlation coefficient between the input reflectance image 206 and the registered reflectance image 222 in a state where the input reflectance image 206 is moved, based on the displacement of the input reflectance image 206 when the distance difference is smallest, with respect to the registered reflectance image 222. The determining unit 116 determines that the input reflectance image 206 is identical to the registered reflectance image 222 if the correlation coefficient is equal to or larger than a predetermined set value. In addition, though not shown in the figures, the displacement storing unit 124 may store distance difference as well as displacement, and the determining unit 116 may calculate correlation coefficients in order from a registered reflectance image 222 having a smallest distance difference, with reference to the displacement storing unit 124.

For example, the determining unit 116 may calculate correlation coefficients between the input reflectance image 206 and the entire registered reflectance images 222. In addition, the determining unit 116 may perform block division to the input reflectance image 206 and the registered reflectance image 222 so as to correspond to each other and calculate a correlation coefficient for each block.

Hereinafter, the example where a correlation coefficient is calculated for each block will be described. The determining unit 116 performs block division to the input reflectance image 206 and the registered reflectance image 222 in each corresponding region. The determining unit 116 calculates a correlation coefficient between blocks at each block. Subsequently, the determining unit 116 multiples the correlation coefficient of each block by a weighted coefficient which becomes higher as the block has a higher correlation coefficient, and calculates a value (weighted mean value) obtained by dividing the sum of products of weighted coefficients of the entire blocks and the correlation coefficient by the sum of all weighted coefficients. In addition, at the block division, in order to enhance recognition accuracy, the blocks may be overlapped with each other.

By doing so, a correlation coefficient of a block having a low correlation coefficient is multiplied by a low weighted coefficient. For this reason, for example, influences of different blocks caused by the presence of glasses or different hairstyles of the same person may be reduced, and the correlation coefficient may be calculated based on the similarity of blocks which do not vary due to the difference in situations.

In addition, as another example, in the case where a correlation coefficient is calculated for every block, the weighted coefficient placed on the correlation coefficient may be obtained by learning, or a higher weighted coefficient may be placed in the order of criticalities of facial parts.

In addition, the determining unit 116 may calculate a correlation coefficient between the input reflectance image 206 and each registered reflectance image 222, by employing various methods used for determining similarity in face authentication. For example, the determining unit 116 may calculate a correlation coefficient by giving a weight to a specific feature portion of the face in the input reflectance image 206 and the registered reflectance image 222.

Figure 7:
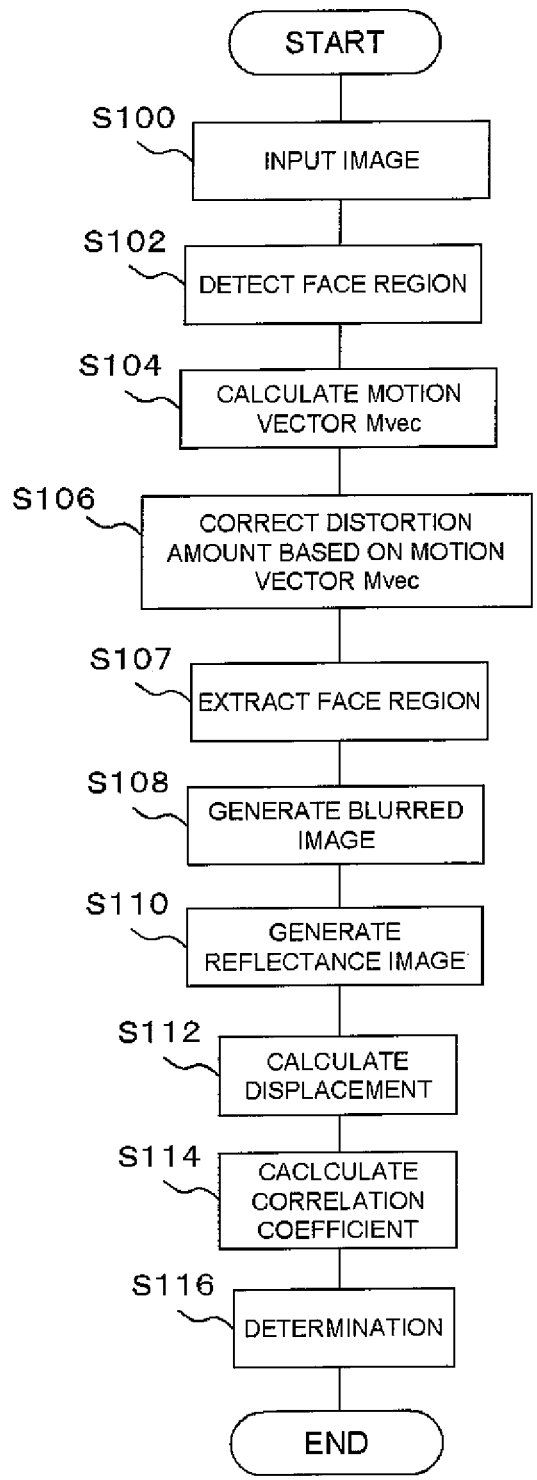
FIG. 7 is a flowchart for illustrating a processing order of the face authentication system according to the embodiment of the present invention.

FIG. 7 is a flowchart for illustrating a processing order of the face authentication system 100 of this embodiment. First, the image input unit 102 inputs an input image 200 (S100). Subsequently, the face region detecting unit 104 detects a face region from the input image 200 as an input face region image 201 (S102). Subsequently, the motion vector calculating unit 132 of the first distortion amount correcting unit 106 calculates a motion vector (Mvec) for the average face image 220 of the input face region image 201 (S104). Thereafter, the position distortion correcting unit 134 corrects a region corresponding to the input face region image 201 of the input image 200 based on the motion vector (Mvec) (S106). Thereafter, the face region detecting unit 104 extracts the face region from the input image 200 where the region corresponding to the input face region image 201 is corrected, as the input face image 202 (S107).

Subsequently, the blurred image generating unit 108 of the reflectance image generating unit 107 generates a blurred input image 204 based on the input face image 202 (S108). Subsequently, the separating unit 110 generates an input reflectance image 206 based on the Retinex theory by using the input face image 202 and the blurred input image 204 (S110).

Thereafter, the second distortion amount correcting unit 114 of the face authenticating unit 112 respectively calculates a displacement where a distance between the input reflectance image 206 and each registered reflectance image 222 is the smallest (S112). Subsequently, the determining unit 116 calculates a correlation coefficient between the input reflectance image 206 and each registered reflectance image 222, in consideration of the displacement where the distance difference is small, calculated in Step S112 (S114). The determining unit 116 determines that the input reflectance image 206 is identical to the registered reflectance image 222 in the case where the correlation coefficient is equal to or larger than a predetermined set value (S116). Here, in the case where the correlation coefficient cannot be equal to and larger than the predetermined set value even though all registered reflectance images 222 are compared, the determining unit 116 outputs that the input image 200 cannot be authenticated.

According to the processing order of the face authentication system 100 of this embodiment, the first distortion amount correcting unit 106 calculates a motion vector of the input face region image 201 in respect to the average face image 220, and corrects the position distortion based on the calculated motion vector. Since the motion vector of a single image is calculated by using the average face image 220, for example, the calculation amount can be reduced in comparison to the case where each of a plurality of registered reflectance images 222 stored in the registered reflectance image storing unit 122 is compared. Note that, in the correction using the average face image 220, a minute position distortion may remain. The face authentication system 100 of this embodiment corrects the position distortion by the first distortion amount correcting unit 106, and then, in a state where the input reflectance image 206 is moved by the second distortion amount correcting unit 114 in respect to each registered reflectance image 222, the position distortion is corrected again. As a result, since the face authentication may be performed in a state where a minute position distortion is corrected based on individual variation when the average face image 220 is used, it is possible to perform face authentication with a high degree of accuracy while reducing the amount of calculation.

In the above embodiment, after the first distortion amount correcting unit 106 corrects position distortion of the input face region image 201 (after S104 and S106), the reflectance image generating unit 107 generates the input reflectance image 206 by using the corrected input face image 202 (S108 and S110). By performing the process in the above order, the input face image 202 can be extracted in a state where the face position distortion is corrected. For this reason, even though the size of the input face image 202 is small, the face portion may be extracted with high accuracy, and thereby the size of the input face image 202 may be reduced. By doing so, in the process of generating the input reflectance image 206, the amount of processing becomes small, which reduces the calculation cost. In this example, the input face image 202 may have a smaller size than the input face region image 201.

Meanwhile, as another example, the process by the first distortion amount correcting unit 106 and the process by reflectance image generating unit 107 may change their orders. In other words, the reflectance image generating unit 107 may generate the input reflectance image by using the input face region image 201 as the input face image 202 before the input face region image 201 is corrected by the first distortion amount correcting unit 106. In this case, the reference face image storing unit 120 may store the reflectance image of the average face image 220. The first distortion amount correcting unit 106 may calculate a motion vector of the input reflectance image of the input face image 202 generated by the reflectance image generating unit 107, with respect to the reflectance image of the average face image 220 stored in the reference face image storing unit 120, and correct the position distortion of the input reflectance image of the input face region image 201 based on the corresponding motion vector. In this case, since the first distortion amount correcting unit 106 may correct the position distortion by comparing reflectance images free from the influence of photographic environments, the position distortion may be corrected without being influenced by the photographic environments.

EXAMPLES

A face image photographed under the condition where an illumination from a specific direction is not present is set as an original image (a), and in regard to the original image data (a), the illumination condition is processed so that an illumination light is cast with a predetermined intensity from a predetermined direction to prepare illumination condition-changed images (b to g). The illuminating direction of each illumination condition-changed image (b to g) is shown in Table 1.

Example

Reflectance Image

In regard to each of the original image (a) and the illumination condition-changed images (b to g), a reflectance image was obtained in the same order as described above. The reflectance images obtained based on the original image (a) and the illumination condition-changed images (b to g) are respectively called reflectance images (a' to g'). Here, after a Gaussian filter with a filter size of 15×15 pixels was applied, a Gaussian filter with a filter size of 7×7 pixels was applied.

Figures 9, 10:
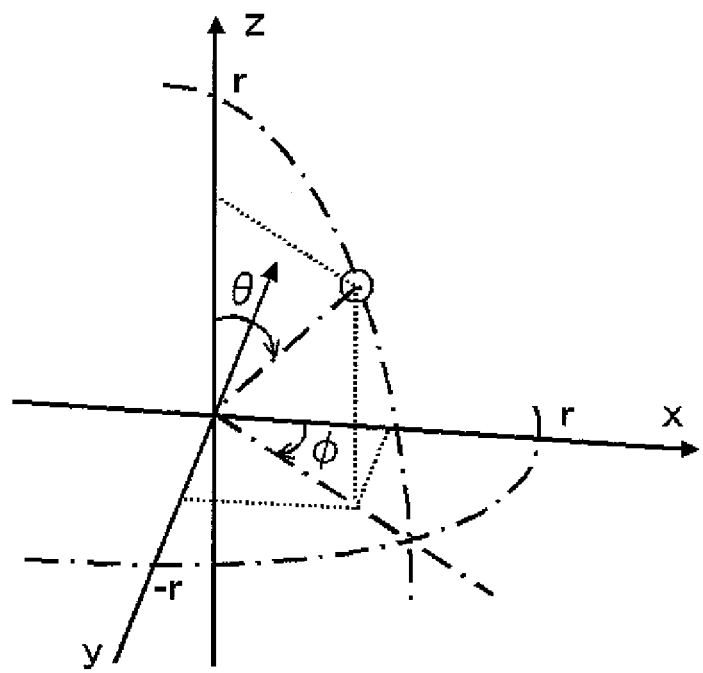
FIG. 9 is a diagram for illustrating an illuminating direction in an example and a comparative example.
FIG. 10 is a diagram showing a coefficient of a Sobel filter used in a comparative example.

The similarity of each reflectance image (b' to g') and the reflectance image (a') was calculated to obtain a correlation coefficient. The result is shown in Table 1. FIG. 9 is a diagram for illustrating the illuminating direction. Here, in the case where the face is located at an original point of x coordinate, y coordinate, and z coordinate, the light source is located at a position having a distance r from the original point, an angle $\theta$ to the positive direction on the z axis (on the z axis at a position above the original point in the figure), a positive direction in the x axis (a position to the right of the original point in the figure), and an angle φ in a direction (clockwise direction) from a positive position in the x direction to a negative position in the y direction, and light is cast toward the original point. In addition, the front-oriented direction of the face is set to be θ=45 degrees and φ=0 degree.

Comparative Example 1

Non-Treatment

A correlation coefficient was obtained by calculating similarity between each illumination condition-changed image (b to g) and the original image (a). The result is shown in Table 1.

Comparative Example 2

Edge (Sobel Filter)

The edge was processed using a Sobel filter in regard to the original image (a) and each illumination condition-changed image (b to g). The Sobel filter had a 3×3 size shown in FIG. 10. The filter of FIG. 10a was applied in the x direction (horizontal direction) of each image, and the filter of FIG. 10b was applied in the y direction of each image.

The edge-processed images obtained based on the original image (a) and the illumination condition-changed images (b to g) are respectively set to be edge-processed images (a" to g"). Similarity between each edge-processed image (b" to g") and the edge-processed image (a") was calculated, and a correlation coefficient was obtained. The result is shown in Table 1.

(Result)

As shown in Table 1, in any condition, since similarity is determined by comparison between reflectance images, the correlation coefficient can be enhanced rather than the case where non-treated images are compared or edge-processed images are compared.

TABLE 1

| Image data | Illuminating direction θ | φ | Example Reflectance image | Comparative example 1 Non-treatment | Comparative example 2 Edge (Sobel filter) |
|---|---|---|---|---|---|
| b b' b" | 45 | 5 | 0.82 | 0.75 | 0.75 |
| c c' c" | 45 | 10 | 0.82 | 0.72 | 0.73 |
| d d' d" | 60 | 25 | 0.45 | 0.36 | 0.40 |
| e e' e" | 45 | 15 | 0.70 | 0.64 | 0.57 |
| f f' f" | 30 | 15 | 0.54 | 0.48 | 0.37 |
| g g' g" | 45 | 350 | 0.73 | 0.72 | 0.55 |

Each component of the face authentication system 100 shown in FIGS. 1, 3 and 5 is not a hardware unit configuration but a functional unit block. Each component of the face authentication system 100 is implemented by an arbitrary combination of hardware and software, based on a CPU of a computer, a memory, a program which implements each component loaded in the memory as shown in the figure, a storing unit such as a hard disk storing the program, and an interface for the connection to a network. In addition, its implementation method and apparatus has various modifications as apparent to those skilled in the art.

Heretofore, the embodiments of the present invention have been described with reference to the drawings, but they are just examples, and various configurations may also be adopted other than the above.

For example, in the above embodiment, the blurred image generating unit 108 applies a Gaussian filter to the input face image 202. However, as another example, the blurred image generating unit 108 may apply, for example, a pseudo Gaussian filter using a discrete Fourier transform to generate the blurred input image 204 of the input face image 202. By this process, the blurred input image 204 may be generated rapidly.

In addition, as another example, the blurred image generating unit 108 may apply an average filter to the input face image 202 to generate the blurred input image 204 of the input face image 202. In this case, the average filter may substitute the pixel value of each pixel of the input face image 202 with an average value of pixel values of the corresponding pixel and surrounding pixels. The average filter may be a box of a predetermined size. In addition, even when the average filter is used, the average filter may be applied to the input face image 202 several times. In the case where the average filter is applied to the input face image 202 several times, for example, it is possible to apply an average filter of a large filter size and then apply an average filter of a small size. By this configuration, it is possible to obtain the entirely blurred input image 204 with good accuracy while retaining local features of the input face image 202.

In the above embodiment, the first distortion amount correcting unit 106 calculates a motion vector of the input face region image 201 with respect to the average face image 220 based on the average face image 220. However, as another example, the first distortion amount correcting unit 106 may also calculate a motion vector of each registrant with respect to the face image by comparing face images of registrants in the registered reflectance image storing unit 122. When the above process is performed, it is needed to calculate a motion vector of every face image of each registrant, which increases the amount of calculation. However, since the position distortion may be corrected with high accuracy by the process of the first distortion amount correcting unit 106, for example, the process of Step S112 of FIG. 7 may be excluded.

In addition, in the case where face region detecting unit 104 cannot detect the face region from the input image 200 or in the case where the first distortion amount correcting unit 106 cannot detect a feature when calculating the motion vector, the face authentication system 100 may intercept, for example, the operation of the face authenticating unit 112 as an authentication error. In addition, for example, the face authentication system 100 may perform face authentication between the input face image 202 and the average face image 220 by the face authenticating unit 112, at the time when the input face image 202 is extracted by the face region detecting unit 104, and in the case where a correlation coefficient between them is very low, an error treatment may be performed. By doing so, for an image which cannot be authenticated, it is possible to stop comparing with a plurality of

The invention claimed is:

1. A face authentication system, comprising:
a reflectance image generating unit for generating a blurred image of an input image based on the input image including a face of a person and generating an input reflectance image by separating each corresponding pixel value of the blurred image from each pixel value of the input image;
a face authenticating unit for performing face authentication of the face of the person included in the input image by comparing the input reflectance image with a registered reflectance image of a previously registered person;
a motion vector calculating unit for calculating a motion vector of the input image or the input reflectance image with respect to a previously registered reference face image; and
a position distortion correcting unit for correcting a position distortion of the face of the person included in the input image or the input reflectance image based on the motion vector,
wherein the face authenticating unit performs face authentication based on the input reflectance image after a position distortion is corrected by the position distortion correcting unit, and
wherein the face authenticating unit moves the input reflectance image, the position distortion of which is corrected by the position distortion correcting unit with respect to the registered reflectance image in unit of a pixel in a two-dimensional direction within a predetermined range, calculates similarity between the input reflectance image and the registered reflectance image in each state of position, and performs face authentication based on the input reflectance image and the registered reflectance image in a state of the highest similarity.

2. The face authentication system according to claim 1, wherein the face authenticating unit determines that the person included in the input image is identical to the person of the registered reflectance image when a correlation coefficient of the pixel values of the input reflectance image and the registered reflectance image is equal to or larger than a predetermined set value.

3. The face authentication system according to claim 1, wherein the blurred image generating unit generates the blurred image by applying a Gaussian filter to the input image.

4. The face authentication system according to claim 1, wherein the reference face image is an image of an average face which is an average of a plurality of persons' faces.

5. A face authentication method, comprising the following steps of:
generating a blurred image of an input image based on the input image including a face of a person and generating an input reflectance image by separating each corresponding pixel value of the blurred image from each pixel value of the input image;
performing face authentication of the face of the person included in the input image by comparing the input reflectance image with a registered reflectance image of a previously registered person;
calculating a motion vector of the input image or the input reflectance image with respect to a previously registered reference face image; and
correcting a position distortion of the face of the person included in the input image or the input reflectance image based on the motion vector;
wherein the step of performing face authentication is conducted based on the input reflectance image after a position distortion is corrected, and
wherein the step of performing face authentication further comprising steps of:
moving the input reflectance image, the position distortion of which is corrected, with respect to the registered reflectance image in unit of a pixel in a two-dimensional direction within a predetermined range,
calculating similarity between the input reflectance image and the registered reflectance image in each state of position, and
performing face authentication based on the input reflectance image and the registered reflectance image in a state of the highest similarity.

6. A non-transitory computer readable medium containing a face authentication program, which allows a computer to conduct:
a reflectance image generating operation for generating a blurred image of an input image based on the input image including a face of a person and generating an input reflectance image by separating each corresponding pixel value of the blurred image from each pixel value of the input image;
a face authenticating operation for performing face authentication of the face of the person included in the input image by comparing the input reflectance image with a registered reflectance image of a previously registered person;
a motion vector calculating operation for calculating a motion vector of the input image or the input reflectance image with respect to a previously registered reference face image; and
a position distortion correcting operation for correcting a position distortion of the face of the person included in the input image or the input reflectance image based on the motion vector,
wherein the face authenticating operation performs face authentication based on the input reflectance image after a position distortion is corrected, and
wherein the face authenticating operation moves the input reflectance image, the position distortion of which is corrected, with respect to the registered reflectance image in unit of a pixel in a two-dimensional direction within a predetermined range, calculates similarity between the input reflectance image and the registered reflectance image in each state of position, and performs face authentication based on the input reflectance image and the registered reflectance image in a state of the highest similarity.

* * * * *